Figure 1:
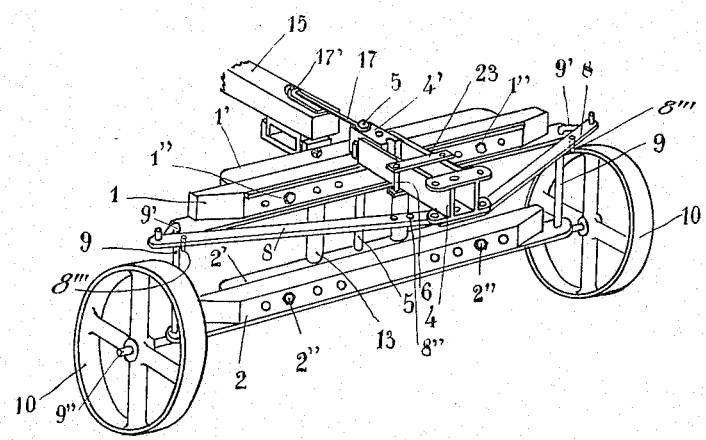

E. CHAUTARD.
TONGUE TRUCK.
APPLICATION FILED MAY 21, 1914.

1,129,332.

Patented Feb. 23, 1915.
4 SHEETS—SHEET 1.

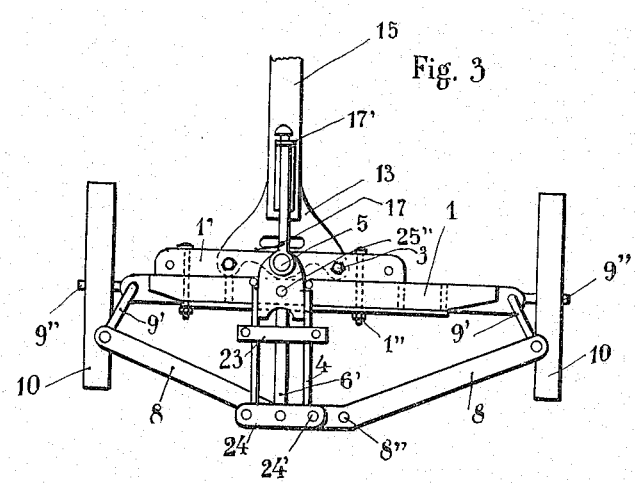
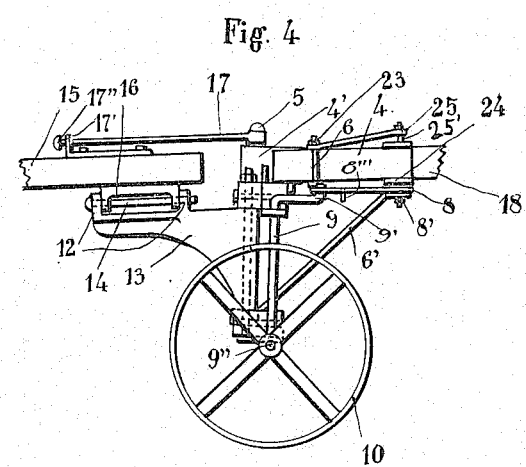

E. CHAUTARD.
TONGUE TRUCK.
APPLICATION FILED MAY 21, 1914.

1,129,332.

Patented Feb. 23, 1915.
4 SHEETS—SHEET 3.

E. CHAUTARD.
TONGUE TRUCK.
APPLICATION FILED MAY 21, 1914.

1,129,332.

Patented Feb. 23, 1915.
4 SHEETS—SHEET 4.

UNITED STATES PATENT OFFICE.

EUGÈNE CHAUTARD, OF CORBIGNY, FRANCE.

TONGUE-TRUCK.

1,129,332.     Specification of Letters Patent.     Patented Feb. 23, 1915.

Application filed May 21, 1914. Serial No. 840,081.

*To all whom it may concern:*

Be it known that I, EUGÈNE CHAUTARD, a citizen of the French Republic, residing at Corbigny, in the Department of Nièvre, France, have invented a certain new and useful Tongue-Truck, of which the following is a specification.

This invention has for its object to provide an improved animal-drawn fore-carriage for harvesting machines, such as reapers, binders, sheaf-laying machines and mowers.

Hitherto a fore-carriage has been employed only with binding reapers for which machines it is absolutely necessary, whereas in the case of other machines the horses are harnessed directly to the draft pole of the machine. It is however desirable to provide a fore-carriage for machines other than binding reapers because such an apparatus would greatly diminish the strain on the horses; but hitherto a fore-carriage has not been used in those cases owing to the diversity of the characteristics of the machines which effect the cutting, sometimes to the right, sometimes to the left of the machine, and in which the draft poles are located at varying points between the wheels.

A fore-carriage constructed according to the present invention constitutes a universal apparatus which can be adapted for use with various constructions of machines and various types of machines and which will allow of the machine being drawn with a minimum of strain on the animals, and on the machine, without interfering with the stability of the machine on the ground and the facility of handling and maneuvering the same. This improved universal fore-carriage for harvesters may as above stated, be applied indiscriminately to all machines irrespective of the side on which they cut, and the position of the draft pole. Further in the case of its application to binding reapers where it is used in substitution for the ordinary fore-carriage of such machines, the improved fore-carriage provides considerable advantages due to the fact that the draft pole of the drawn machine is able to turn through a determined angle about a horizontal axis relative to the fore-carriage. This assures a constant contact of both wheels upon the ground, whereas in the case of the usual fore-carriages of binding reapers, it often happens that one wheel only is bearing on the ground thus rendering the draft difficult and sometimes causing a breakage of the connection with the drawn machine. The improved fore-carriage thus allows of employing a fore-carriage in all cases where none is used at present, and its use is accompanied by considerable advantages in those cases where it is employed instead of the ordinary fore-carriages of binding reapers.

Figure 2:
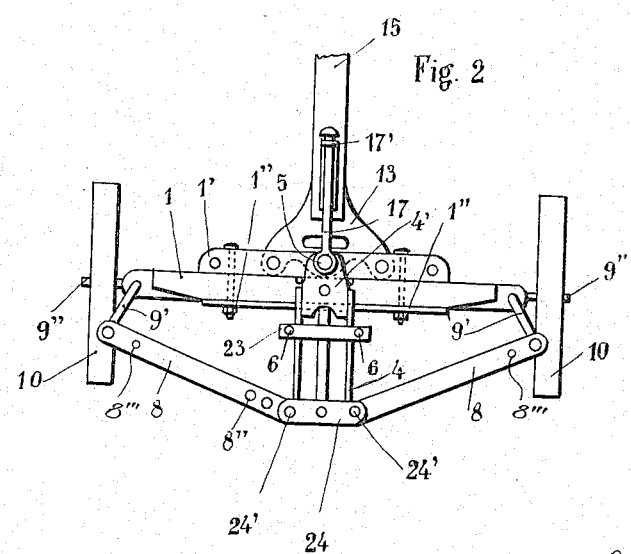
Figure 5:
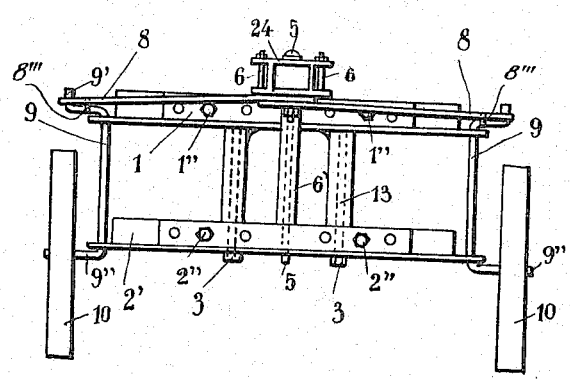
Figure 6:
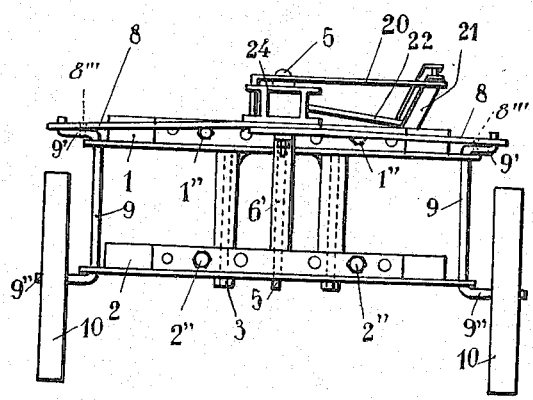
Figure 7:
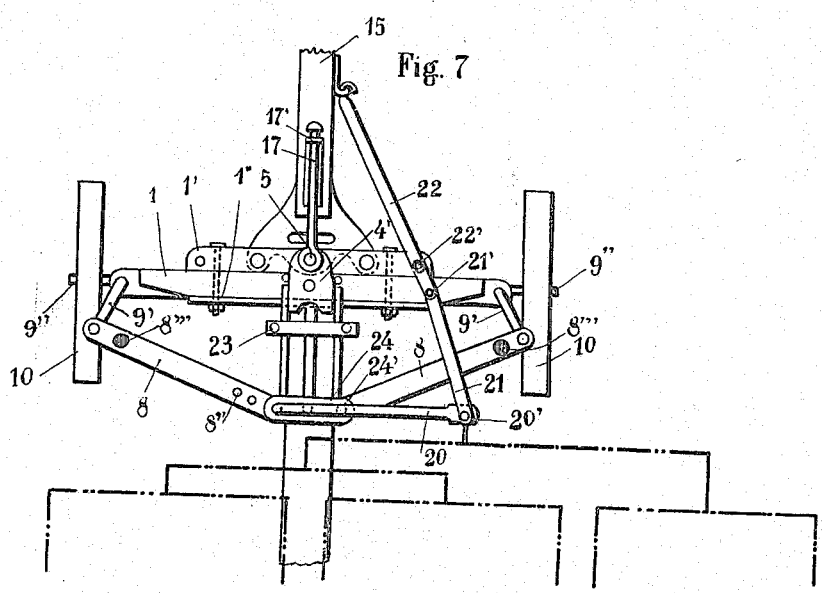

One embodiment of the improved universal fore-carriage is illustrated by way of example in the accompanying drawings, in which:

Figure 1 is a perspective front elevation thereof; Fig. 2 is a plan; Fig. 3 is a diagrammatic plan illustrating the manner in which the framing of the apparatus may be modified according to the type of harvester with which it is to be employed (according as said harvester is designed to cut on the right or on the left hand). The figure shows the fore-carriage arranged for cutting on the right hand. Fig. 4 is a side elevation thereof; Fig. 5 is a front elevation; Figs. 6 and 7 are respectively a front end elevation and a plan showing the improved fore-carriage provided with means for enabling it to be drawn by three horses.

As shown, the improved fore-carriage comprises a frame composed of two similar parallel beams each formed of two pieces of wood 1—1', 2—2' arranged side by side in a horizontal plane. These pieces 1—1' as also the pieces 2—2' are assembled by means of bolts 1'' and 2'' and they are pierced with a suitable number of holes for allowing of fixing the pieces 1 and 2 symmetrically with reference to the pieces 1' and 2', or of shifting them apart to the right or to the left as shown in the diagrammatic Fig. 3, according to the type of harvester (right hand cut or left hand cut) to which the fore-carriage is to be attached.

The pieces 1' and 2' are connected by a metal bracket 13 which is assembled therewith by means of bolts 3. The bracket 13 comprises at its upper part two lugs 12 which serve as bearings for a pivot pin 14.

The draft pole 15 of the harvester which is intended to be mounted on top of the bracket 13 by means of the pivot pin 14, is provided on its under side with a part 16 mounted on the pivot pin 14 in such a manner that the draft pole 15 of the harvester is able to move through an angle by turning on the pivot pin 14.

The draft pole 15 is connected to a pivot pin 5 (described more particularly hereinafter) which is fixed to the pieces 1' 2' by means of a rod 17 having at one end an eye engaging with the vertical pivot pin 5 and engaging freely at its other end in a support 17' fixed to the upper side of the draft pole 15. This end of the rod 17 is screw threaded to receive a nut 17'' for securing the same. The draft pole to which the horses are harnessed and which is indicated at 18 (Fig. 4) is fitted at its end in a socket which is arranged at right angles to the framing 1' 2' and is formed of two parallel iron section bars 4 with suitable cross pieces and bolts. The cross pieces 24 at the end of said socket are pierced with holes 24' to receive a specially shaped member for the purpose of harnessing the fore-carriage to three horses as hereinafter described.

The socket 4 is engaged at its rear end 4' on the aforesaid vertical pivot pin 5 which is fixed to the beams 1' and 2' in such a manner that the piece 4—4' can turn on the said pivot pin 5 to suit any changes in the direction of the draft. Upon the socket 4 there is fixed a part 23 which serves to hold the parts 6 which are in their turn maintained on their supports by shoulders formed on the parallel bars of the socket 4; these parts 6 are designed to butt against the beam 1 in the angular movement of the draft pole 18; they serve to limit the said angle which varies according to the positions of the group of the beams 1' and 2' relatively to the group of the beams 1 and 2 as shown for example in Fig. 3. This limitation of the angle is necessary in order to prevent in turning the horses from going too far and injuring themselves on the point of the divider of the harvester, and also for preventing the wheels from assuming too great an angle. At the same time fingers 8''' which are fixed to the connecting rods 8 are adapted to engage the arms 9'.

The cross pieces 24 of the socket 4 are pierced at their center with a hole in which, for the lower part 24, there is fitted a bolt 8' which serves as a pivot for the connecting rods 8 and for a strut 6' of the socket 4. The connecting rods 8 are connected at one end to the crank-portions 9' of the crank axles 9 which carry the journals 9'' of the wheels 10 in the usual manner; these crank axles being mounted in the beams 1 and 2. The connecting rods 8 have holes 8'' for adjustment according to the different positions of the apparatus. The upper cross piece 24 receives a bolt 25' that serves to attach the swing bar for two horses to a part 25 attached at its other end to a bolt engaged at 25'' upon the part 4' of the member 4. This bolt is generally constituted by the member that supports the guides.

Owing to the framing composed of the two groups of beams 1, 2 and 1', 2' the improved fore-carriage allows of shifting the wheels right or left according to the type of harvester employed. This special feature of the improved fore-carriage allows in the case of sloping crops, of moving the wheels aside to a certain extent without shifting the line of draft of the tongue truck. This peculiarity is very valuable in the case of mowers because it allows of adjusting the wheels of the fore-carriage to those of the mower so that these latter wheels are caused to follow the same track, and are thus enabled to clear the cut grass because the swath cut by the mower is located between the wheels, and this peculiarity is special to the improved fore-carriage. Further the construction of the connection between the draft pole 15 of the harvester and the framing 1', 2' allows of the said pole assuming together with its wheels, an inclination relatively to the draft pole 18 of the fore-carriage. This articulation allowing of transverse inclination is valuable by reason of the flexibility which it thereby imparts to the traveling of the machine and the facility which it affords to the steering. This peculiarity is a very important advantage.

Figs. 6 and 7 illustrate the improved fore-carriage provided with an apparatus for harnessing three horses to one and the same swing bar either to the right or to the left. As already stated the parts 24 of the end of the socket 4 are provided at their ends with two holes 24'. Now according to the type of harnessing employed there is adapted to be engaged in one or other of these holes a cranked arm 20 which projects laterally and which is connected at its upper end 20' to a bar 21 which is attached at 21' to the end of a bar 22 which is fixed at 22' to the upper beam 1' and extends thence to the draft pole 15 to which it is connected. As shown in Fig. 7 this apparatus allows of harnessing three horses to the fore-carriage by attaching a main swing bar at the point 20'. These parts 21 and 22 are fixed on one side or the other of the fore-carriage according to the direction of cutting of the harvester.

Owing to these various arrangements, the improved fore-carriage constitutes a universal apparatus which is capable of being readily adapted to all types of harvesters and to all modes of harnessing, while affording more favorable conditions of working than are obtained with the usual appliances.

What I claim is:

1. In an animal-drawn fore-carriage for harvesters, a transverse frame comprising a lower beam with a journal at each end, a wheel on each journal, a lower longitudinal slidable along said lower beam, an upper beam parallel to said lower beam, rigid connections between said upper and lower beams, an upper longitudinal slidable along said upper beam and means for fixing said upper and lower longitudinals to their upper and lower beams respectively, a pivotal connection between the draft pole of the fore-carriage and said upper longitudinal, a bracket connected to both said upper and lower longitudinals, adapted to support the draft pole of the harvester and a drawbar pivotally connecting the harvester draft pole to said upper longitudinal, whereby the entire apparatus connecting the fore-carriage draft pole to the harvester draft pole can be shifted, adjusted and fixed out of the central longitudinal vertical plane of the fore-carriage.

2. A tongue truck comprising in combination, transverse frames, a bracket secured to said frames, means for horizontally adjusting said frames with respect to each other, a vertical pivot secured in one of said frames, a draw tongue, a horizontal pivot intermediate said tongue and pivot serving to allow horizontal oscillation of said drawn truck with relation to said frames, substantially as described.

In testimony whereof I have signed my name to this specification in the presence of two subscribing witnesses.

EUGÈNE CHAUTARD.

Witnesses:
 GUSTAVE DUMONT,
 HANSON C. COXE.

Copies of this patent may be obtained for five cents each, by addressing the "Commissioner of Patents, Washington, D. C."